United States Patent
Rowlette et al.

(10) Patent No.: US 6,237,420 B1
(45) Date of Patent: May 29, 2001

(54) DIFFERENTIAL OIL PRESSURE CONTROL APPARATUS AND METHOD

(75) Inventors: Mitchell R. Rowlette, Berea; Mark A. Eifler, Frankfort, both of KY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/291,879

(22) Filed: Apr. 14, 1999

Related U.S. Application Data

(60) Provisional application No. 60/113,235, filed on Dec. 21, 1998.

(51) Int. Cl.⁷ .................................................. G01L 7/00
(52) U.S. Cl. .................................................. 73/714
(58) Field of Search ............................. 73/1.57, 37, 714; 361/22, 24, 25, 27; 62/84, 192

(56) References Cited

U.S. PATENT DOCUMENTS

| | | |
|---|---|---|
| 3,682,574 | 8/1972 | Sanders . |
| 3,705,499 | 12/1972 | Mount et al. ............................. 62/84 |
| 3,965,692 | 6/1976 | Ansted et al. .......................... 62/193 |
| 4,510,547 | 4/1985 | Rudich, Jr. .............................. 361/22 |
| 4,928,500 | 5/1990 | Funahashi et al. ..................... 62/193 |
| 5,067,326 | 11/1991 | Alsenz .................................... 62/193 |
| 5,724,821 | 3/1998 | Lord et al. ............................... 62/84 |

FOREIGN PATENT DOCUMENTS

| | | |
|---|---|---|
| 0522847 | 1/1993 | (EP) . |
| WO 9013745 | 11/1990 | (WO) . |
| WO 9535462 | 12/1995 | (WO) . |

Primary Examiner—William Oen
(74) Attorney, Agent, or Firm—Russell E. Baumann; Frederick J. Telecky, Jr.

(57) ABSTRACT

A microprocessor based control for monitoring oil pressure of compressors can use a normally open or a normally closed pressure switch (S1, S2) and LED indicator (LED1) having a diode isolated power supply (VDD_SENSOR) separate from the power supply (VDD) of the microprocessor (U1). Timing of the microprocessor is derived from the frequency of the line (60 Hz). The microprocessor is normally in a sleep mode and is awakened by each 60 Hz interrupt to check the condition of the pressure switch, the accumulated time that inadequate pressure has occurred and whether the relay needs to be energized and then returns to the sleep mode. The resulting reduced power requirement enables extended retention of accumulated "bad" oil time. Since oil pressure does not build-up to a satisfactory level for the first eight seconds or so upon start-up, the microprocessor senses whether the oil pressure indicates good oil immediately upon start-up which indicates a fault condition and if so will shut the system down but only after approximately four seconds which allows the compressor to be jogged, or momentarily energized, to force refrigerant out of the compressor and into the system, which is necessary on initial start-up of the compressor system.

11 Claims, 9 Drawing Sheets

DIFFERENTIAL OIL PRESSURE CONTROL APPARATUS AND METHOD

This application claims priority under 35 USC 119 (e) (1) of provisional application Ser. No. 60/113,235 filed Dec. 21, 1998.

BACKGROUND OF THE INVENTION

1. Field of the Invention

This invention relates generally to compressors used, for example, in air conditioning and refrigeration systems, and more particularly to a control for detecting unsatisfactory oil pressure conditions in a compressor and for protecting the compressor from damage from such conditions.

2. Brief Description of the Prior Art

The use of electronics to control and detect oil pressure for compressors is known. Conventional controls typically use time and duty cycle of good versus bad oil conditions to stop compressor operations. The prior art oil sensing controls utilized discrete electronics and a normally open oil pressure switch. Whenever a bad oil condition occurred the pressure switch would open and the discrete electronics would begin to time. If the time reached two minutes, a magnetic latching relay would be energized (i.e., the relay would latch) which in turn switched power off to the compressor. This system has the feature that if the pressure switch is disconnected, the control will time out in two minutes. The function of the control is to protect the compressor from the loss of lubrication. This is a time weighted average measurement to avoid nuisance trips (from conditions like defrost where liquid refrigerant may flood back into the compressor momentarily). To implement a time weighted average, the control must maintain the accumulated bad oil time during brief power outages (up to 2 minutes). This implies that voltage must be maintained in the control during these interruptions. When the power is interrupted, the pressure switch opens when the compressor stops (oil pressure is lost) if the pressure switch is a normally open device. This open switch limits power dissipation which in turn prolongs voltage on the control during the power interruption. This prior art system is adequate for the task but has many short comings. First, the oil pressure switch utilizes a magnetized shuttle which moves as the pressure changes and a reed switch. The magnetic shuttle moves toward the reed switch due to increasing oil pressure, which in turn causes the reed switch to close. The oil pressure switch could be made much smaller and less expensive if the pressure moved the magnetic shuttle away from the reed switch but this implies that the oil pressure switch is normally closed. Utilizing the prior art control, the maintenance of voltage during power interruptions would be impossible with a normally closed pressure switch (without expensive signal buffering). Furthermore, the prior art control does not detect if the wires to the sensor are shorted together (in fact the control will continue to allow the compressor to operate forever in this condition). The use of discrete electronics also has the disadvantage that the time to trip cannot be easily changed (i.e., the circuit board must be changed). Fault indicator lights cannot be used with the prior art control, an LED would constitute a continuous current drain on the power supply. This would lead to a loss of time during a power interruption as well. Finally, discrete electronics cannot easily filter noise signals from the sensor signals and require the use of expensive shielded cables in noisy environments.

SUMMARY OF THE INVENTION

It is an object of the present invention to provide a control which overcomes the above noted prior art limitations.

Briefly stated, the present invention relates to a simplified, less costly control with many added features. Features of the control include a separate power supply for the oil sensor, fault indication, compressor "jog" feature, sensor wiring fault detection, and improved noise immunity. A control made in accordance with the invention is shown in the schematic of FIG. 1. The control includes a microcontroller in which all of its timing is derived from the 60 Hz line frequency. The microcontroller is interrupted 60 times every second. One of the features of the invention is that the microcontroller is normally in the sleep mode. In the sleep mode, power dissipation is greatly reduced (cut by two orders of magnitude), the microcontroller is "awakened" by every 60 Hz interrupt that occurs. While awake, the microcontroller checks the condition of the pressure switch, the time that bad oil has been detected (if any), and whether the relay needs to be energized. Upon completion, the microcontroller goes back to sleep. This reduces the power required to operate the control to less than 50 milliwatts. During power outages the 60 Hz interrupts stop and the microcontroller remains in the sleep mode, this insures that the bad oil time that has accumulated will remain as long as possible. Another feature of the invention is the use of a diode isolated power supply to source both the oil pressure sensor and the indicator light. By isolating the power supply of the microcontroller from the sensor, if the sensor closes (draws current) the power drain from the power supply will not affect the retention of the bad oil time in the microcontroller during power outages. In addition, the fault indicator is powered from the isolated supply. Thus the fault indicating LED will not affect time retention during power outages either. Therefore, by employing an isolated power supply for the sensor and LED, a normally closed pressure switch may be employed and a fault indicator added. This fault LED indicator chosen is a dual color device. When a bad oil condition exists the LED is illuminated RED but when a good oil condition exists the color is changed to green. If the microcontroller stops operation (such as a reset that occurs when power is first applied) both colors are illuminated and an orange color is seen. This enhances the diagnostic capability of the control to indicate a faulty control or a microcontroller failure.

The jog feature is added to the control to solve a system level problem. When a semi-hermetic compressor is shipped to a customer, it is generally pre-charged with refrigerant and much of the refrigerant is in liquid form. If the compressor attempts to operate very long with the liquid refrigerant present, damage may be done to the compressor. Once the compressor is installed, the service technician turns the compressor on for a very short duration (1 to 5 seconds) and then quickly turns off the unit. This forces the refrigerant out of the compressor and into the system. This process is called "jogging" the compressor. Notably this process is very uncontrolled (subjective energization times based on the perception of the service technician). A well known characteristic of an oil pump is that it will not produce pressure until spinning at a desired speed. Thus each time the compressor starts, a bad oil condition occurs but only lasts for approximately 8 seconds. If a normally closed oil pressure switch is employed, the switch would be closed until the motor in the compressor reaches 60% of its final rotational speed. This physical characteristic and the need for a JOG of the compressor have been combined to make a feature in this invention. The control first checks the status of the pressure switch as the compressor is starting up. The switch should be closed for 4 to 8 seconds, if the control detects an open switch (good oil) when the compressor starts the unit will shut off the system since the only ways that this could occur are as follows: the pressure switch has failed, the sensor cables are shorted together, or someone has attempted to bypass the pressure switch. This function has been combined with the JOG feature. If the oil pressure switch is open at compressor start up, the compressor is allowed to operate for 3 to 4 seconds and the unit is shut down by energizing the relay. Thus a service technician may start the jog function by simply shorting two wires in the sensor cable. At the same time cable faults, oil pressure sensor faults, and intentional bypasses of the switch will result in the compressor being turned off in at least four seconds.

The use of the microcontroller allows for software techniques to be employed to filter the oil pressure switch input. Furthermore, since the oil pressure sensor is powered from an isolated power supply, noise induced on the power supply lines is not input to the micro. This eliminates the need for expensive shielded cables for noise immunity.

DESCRIPTION OF THE PREFERRED EMBODIMENTS

Figure 1A:
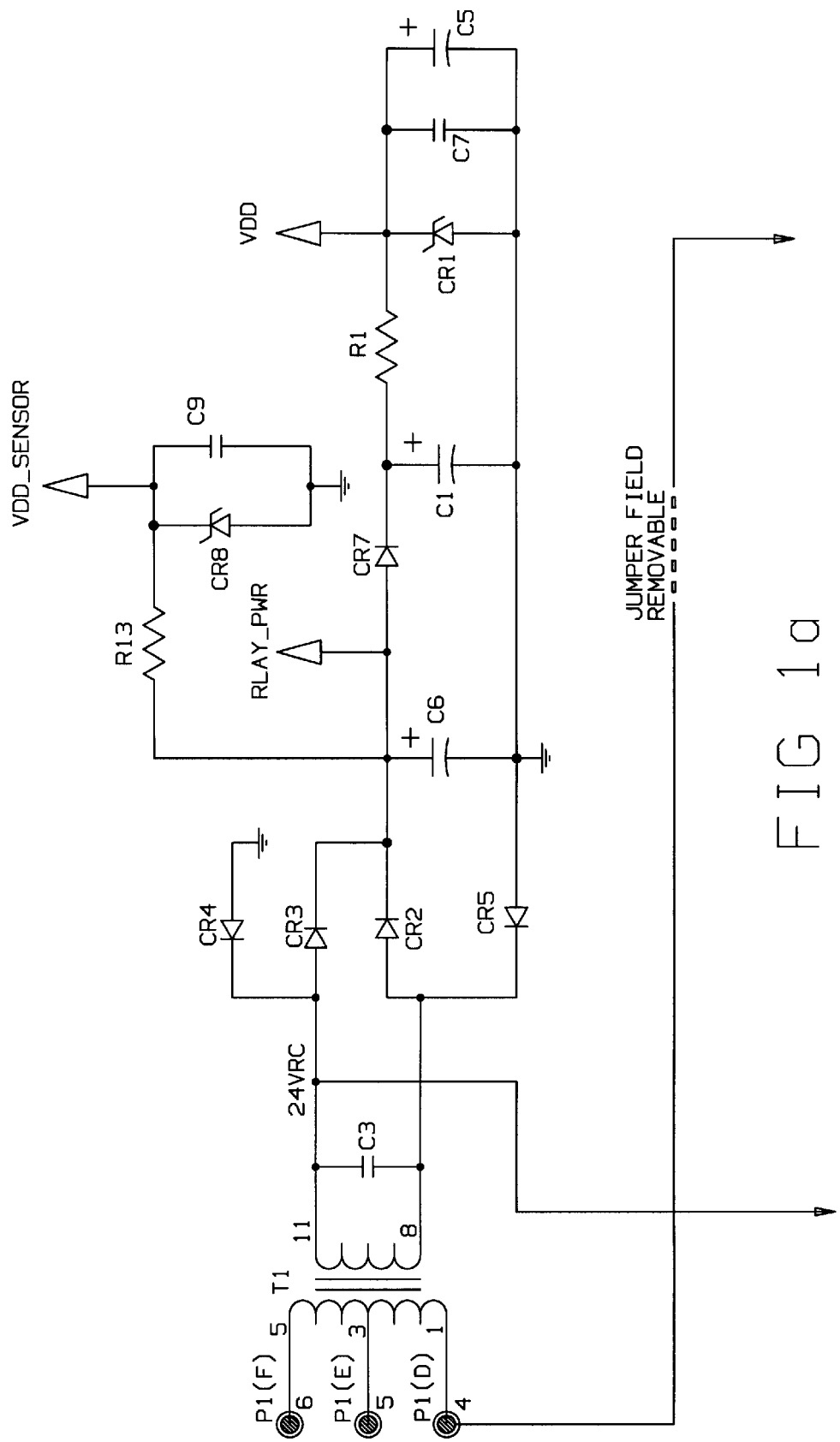
FIGS. 1a and 1b are schematic diagrams of a control circuit made in accordance with the invention.
Figure 1B:
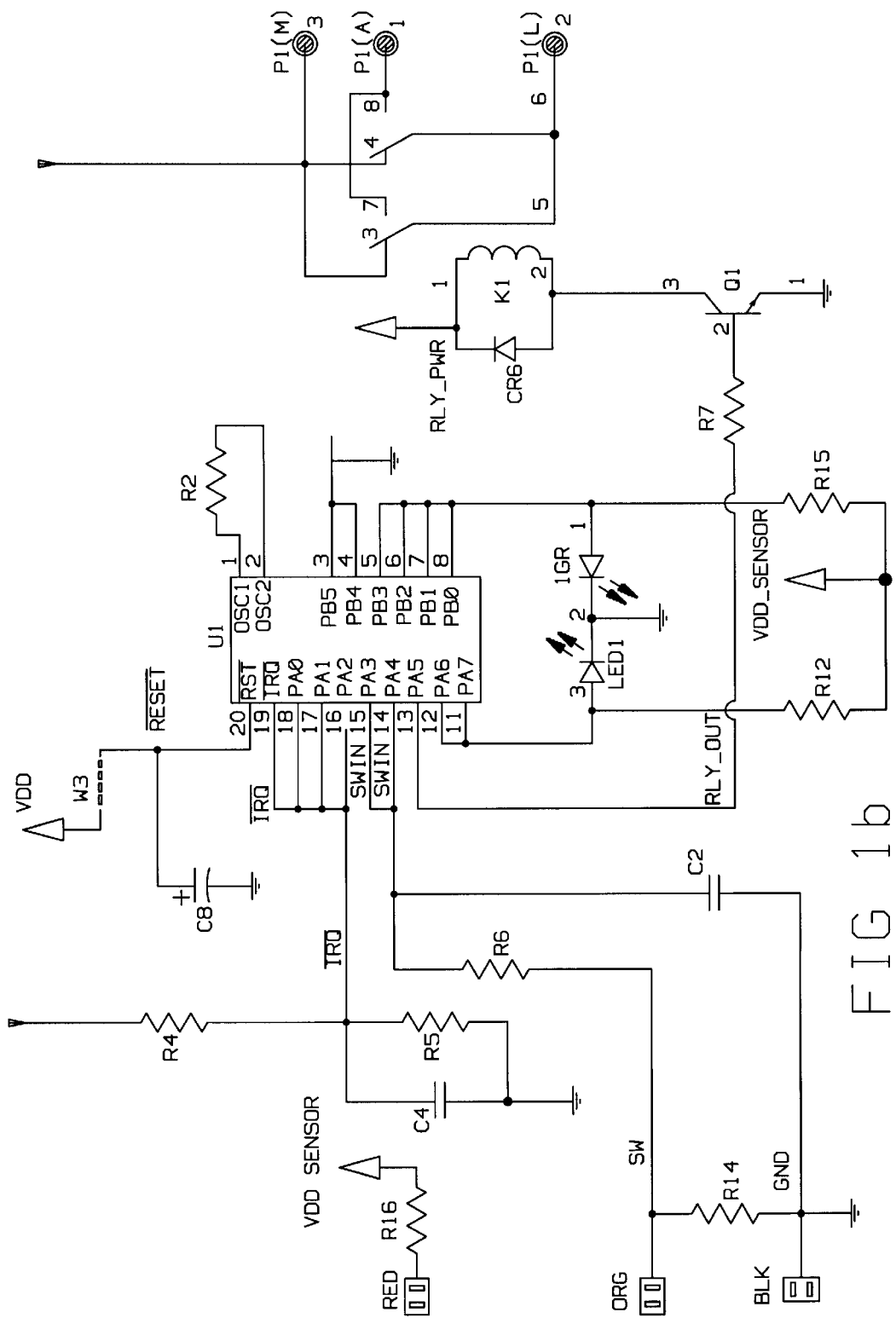
Figure 2:
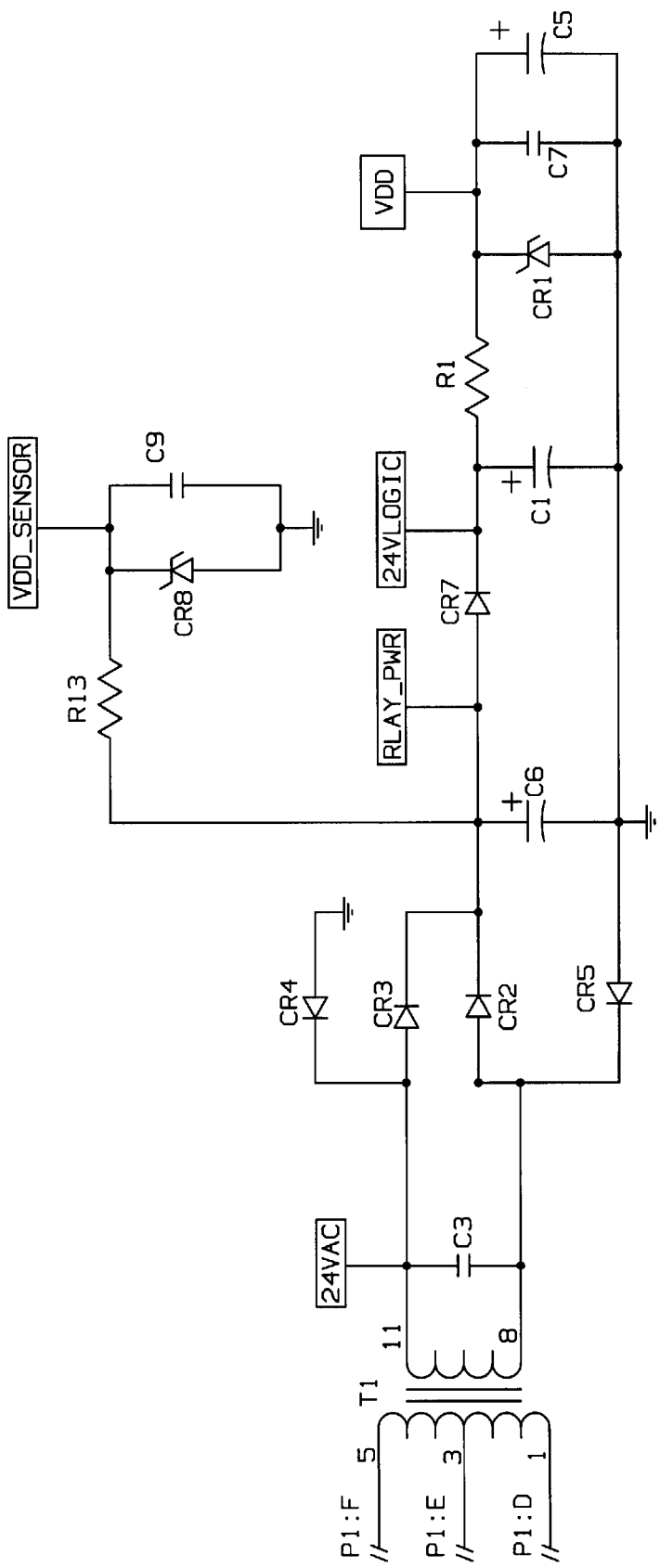
FIG. 2 is a schematic diagram of the power supply section of the FIG. 1 schematic diagram.
Figure 3:
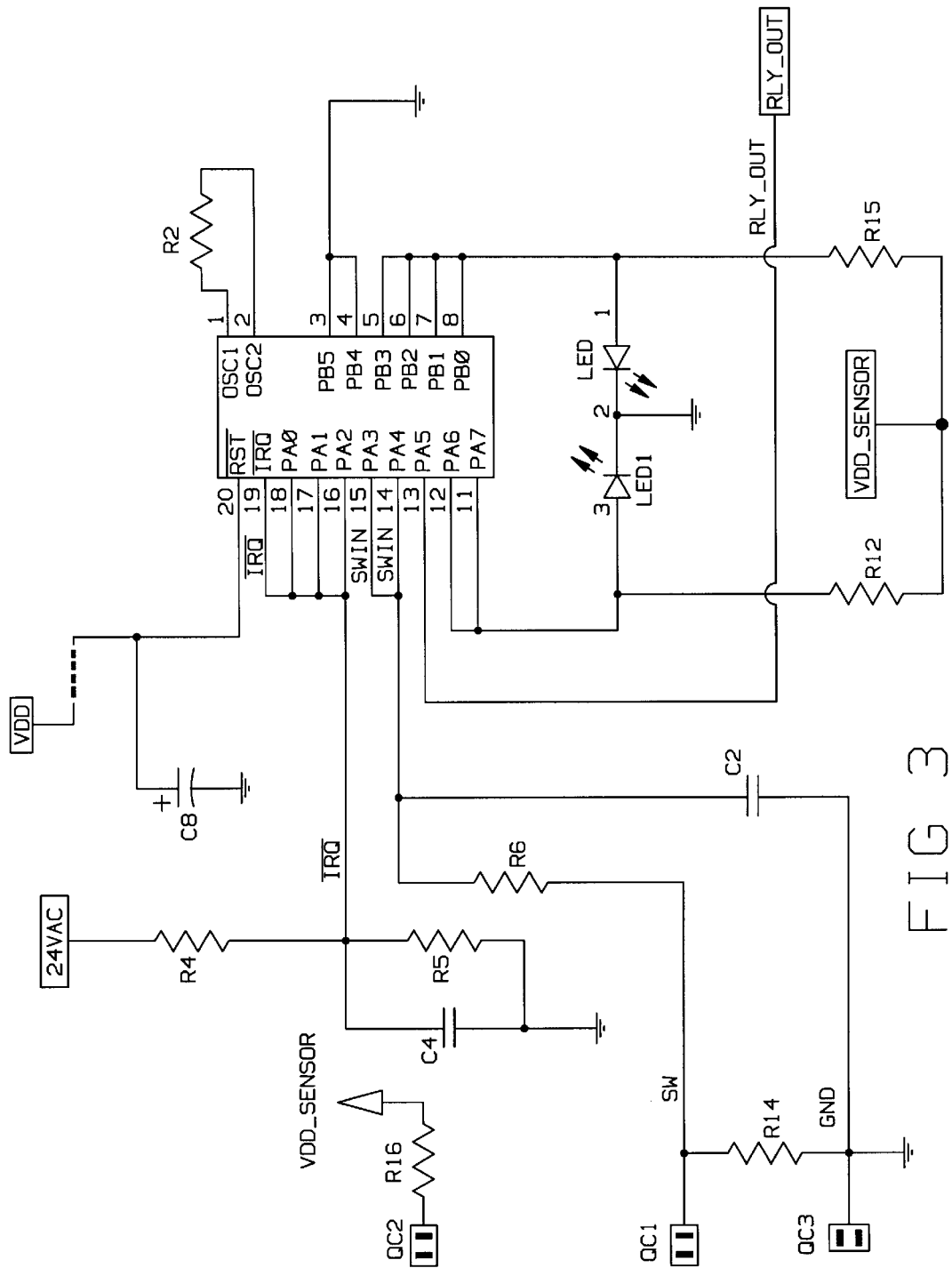
FIG. 3 is a schematic diagram of the micrologic section of the FIG. 1 schematic diagram.
Figure 4:
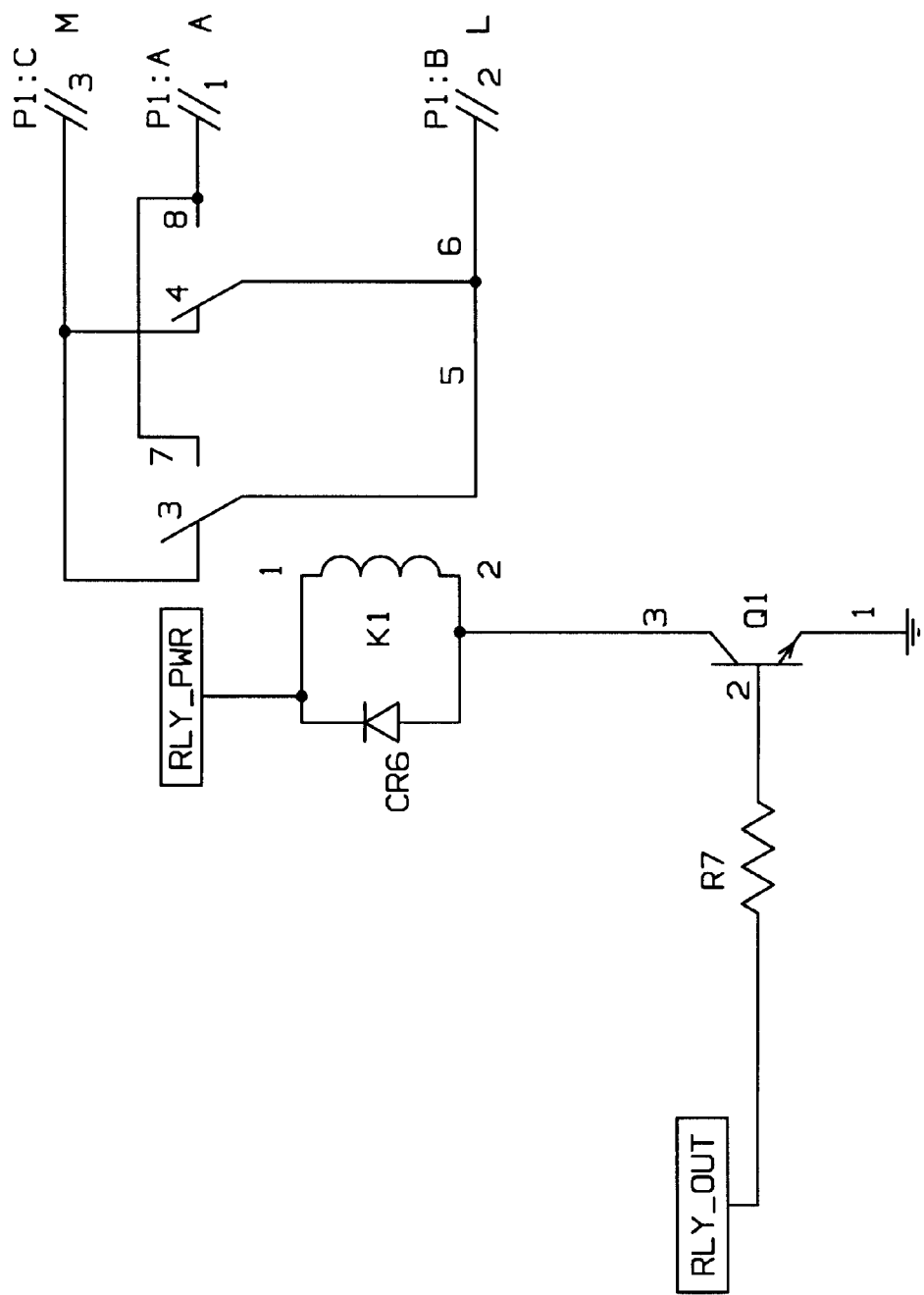
FIG. 4 is a schematic diagram of the relay section of the FIG. 1 schematic diagram.

A low cost differential pressure control circuit made in accordance with the invention is shown in FIG. 1 and comprises three main sections as shown separately in FIGS. 2–4. The first is the power supply section as shown in FIG. 2. The second main section is the micro-logic section, which is depicted in FIG. 3. The final section is the relay section, which is shown in FIG. 4.

The power supply section, FIG. 2, utilizes a step down transformer T1. The input to the transformer is made via screw terminals of connector P1 (positions D, E, and F). The input may be 120 VAC or 240 VAC. The output of the transformer is an 18-volt AC source. This voltage source is full wave rectified by diodes CR2, CR3, CR4, and CR5. The output of this full wave bridge is signal RLAY_PWR. Capacitor C6, a 47uF capacitor is connected across RLAY_PWR and GND to filter AC ripple voltage. RLAY_PWR provides power to drive the relay K1 (FIG. 4) and the microcontroller section to be discussed. Resistor R13 (1.5K ohm) is serially connected to signal RLAY_PWR. It acts as a current limit for the 5-volt zener, CR8. This is signal VDD_SENSOR. Capacitor C9 filters this DC voltage source. VDD_SENSOR supplies power to the differential oil pressure sensor and the LED. Diode CR7 acts to isolate capacitor C1 (220uF) from being discharged by loads attached to RLAY_PWR. The value of C1 is critical to the operation of the control. It is selected to insure that the microcontroller/logic section will have power maintained 60 seconds if the AC power source is interrupted. Pin 2 of C1 is connected to GND. It also acts as a filter to the signal 24VLOGIC. Serially connected to pin 1 of C1 is resistor R1 (1.5K ohm) which acts as a current limit for the cathode connection to CR1, a 5 volt zener. The anode of CR1 is connected to GND; therefore CR1 behaves as a dc voltage regulator for the signal VDD. VDD is the power source for the microcontroller/logic section. Capacitors C7 (0.1uF) and C5 (10uF) are connected between VDD and GND to filter noise from the power source.

The micro/logic section, FIG. 3, comprises U1 (a 68HC05J1 microcontroller), light emitting diode LED1, resistors R2, R4, R5, R6, R12, R14, R15, R16, and capacitors C2, C4, and C8. Resistor R4 (100K ohm) is serially connected to 24VAC, the output of T1 (transformer). The other side of R4 is connected to the interrupt input of U1 (pin 19) which is signal IRQ. Capacitor C4 (0.01 uF) and resistor R5 (100K ohm) are connected between IRQ and GND. Resistor R4 and capacitor C4 create a low pass filter on the signal from the transformer T1 (18VAC). Resistor R5 controls the DC bias and insures that capacitor C4 discharges on each cycle of the 18VAC signal. The signal IRQ is a 60 Hz, 0 to 5vdc square wave. Pins 16, 17 and 18 are also connected to IRQ but are not used in the software of the microcontroller. However, the diodes internal to the microcontroller limit the voltage of the 60 Hz signal. Resistor R2 is connected between pins OSC1 (pin 1) and OSC2 (pin 2) of U1. R2 sets the operational frequency of the oscillator of the microcontroller. Capacitor C2 (0.1uF) is connected between signal SWIN (pins 14 and 15 of U1) and GND. This capacitor filters out high frequency noise on this input to the micro. Signal SWIN is the differential pressure switch input. Also connected to SWIN is resistor R6 (100K ohm). The other side of R6 is connected to the signal SW. R6 acts to limit current flow from signal SW to the microcontroller. Signal SW is also attached to ¼ inch quick connect QC1. QC1 is connected to the output of the differential oil pressure switch. Resistor R14 (10K ohm) is attached between signal SW and GND. R14 acts as a pull-down on the oil pressure switch. Resistor R16 is connected between ¼ inch quick connect QC2 and VDD_SENSOR. R16 acts to limit current to the oil pressure switch and to set the bias level of the output of the oil pressure switch. The third available connection to the oil pressure switch is QC3, which is affixed to GND. If the differential oil pressure switch is a normally closed device (closed when oil pressure is low) the switch is connected between QC1 and QC3. QC2 (VDD_SENSOR) is shorted (inside the differential pressure switch) to QC1. This causes the signal SWIN (to the micro) to be 0 volts when the differential pressure is bad (switch closed). The signal SWIN (to the micro) will be 4.9 volts when the differential pressure is good (switch open). If the differential oil pressure switch is normally open (i.e., the switch is open if the oil pressure is low), the switch is connected between QC2 (VDD_SENSOR) and QC1. This causes the signal SWIN to be 0 volts if the oil pressure is low (switch open). The signal SWIN will be 4.9 volts if the oil pressure is good (switch closed). It will be seen that a normally open or normally closed differential pressure switch can be used with this control circuit (the signal SWIN is the same if the oil is good (4.9 volts) and the same if the oil is bad (0 volts) for both types of switches). In addition, if the connections to the pressure switch are removed (e.g., a loose cable), the input to the micro, SWIN, is 0 volts due to the pull down resistor R14. LED1 is a dual color light emitting diode. The anode of the red portion of the LED is connected to pins 11 and 12 of U1. Resistor R12 is affixed between VDD_SENSOR and the anode of the red section of the LED. The anode of the green portion of the LED is connected to pins 5, 6, 7 and 8 of U1. Resistor R15 is affixed between VDD_SENSOR and the anode of the green section of the LED. The cathodes of the dual color LED are connected to GND. The microcontroller turns off a color by pulling the anode low. Placing the control lines in a high impedance state (input) turns on a specific color. When the microcontroller initially power up, the control signals attached to the LED are in a high impedance state; therefore both colors of the LED are on at the same time. Likewise during self-test the microcontroller leaves these lines in an input condition, until all tests are successfully completed. Notably, the LED is powered from the second dc power source VDD_SENSOR. This insures that the LED will not use any power reserved in capacitor C1 during an AC voltage interruption as discussed supra. Pin 13 of U1 is attached to signal RLY_OUT, which is applied to the relay subsection.

The relay subsection comprises R7, Q1, K1, CR6 and P1 positions A, B and C. Signal RLAY_OUT from the micro/logic section is connected to resistor R7 (5.1 K ohm). The other side of R7 is connected to the base of transistor Q1 (a MPSA06). R7 sets the bias current to the transistor. The emitter of Q1 is connected to GND. The collector of Q1 is connected to the negative side of the coil of K1. The positive side of the coil of K1 is connected to RLAY_PWR (from the power supply section). The anode of diode CR6 is connected to the collector of Q1 as well. The cathode of CR6 is affixed to RLAY_PWR. With this circuitry, when the microcontroller drives the signal RLAY_OUT to 5 volts, transistor Q1 will begin to conduct current from the collector to the emitter. This in turn causes current to flow through the coil of K1. The relay employed by this control is such that when 9 volts is applied to the coil for 5 milliseconds, the normally closed contacts open and the normally open contacts close. The relay used is also a magnetic latching type. This means that once the contracts change state, they will remain in that state until acted on by an opposite voltage or an external magnet is brought near the relay. The latter method is utilized in this control. When the relay coil is energized as described, the connection between signal L and signal M is broken. A connection is made between L and A. In a typical refrigeration system, L is affixed to an AC power source and M is connected to a contactor, which in turn drives the compressor. The signal A is typically connected to an alarm indicator such as a neon lamp. Thus when the control energizes the relay due to a bad oil pressure condition, an alarm is indicated and the compressor is shut off.

The control circuit operates in the following manner. Whenever power is initially applied to the control circuit module, all module functions are reset and a self test is performed. The microcontroller verifies its internal functionality and the presence and value of the line frequency interrupt. During this operation, the LED indicator will be ORANGE. If the module passes the self test the ORANGE indication will be removed and normal timing functions will begin.

Once the module has passed the self test, the microcontroller goes into a power saving mode. It will remain in this mode until the next AC line frequency interrupt occurs (60 times a second for 60 Hz and 50 times a second for 50 Hz). Whenever the line frequency interrupt occurs, the microcontroller tests the pressure switch input. A low signal on the input (approximately 0 volts) from the sensor indicates a bad oil condition (i.e., low oil pressure). When a bad oil condition is detected the LED is illuminated as RED. A high signal level (approximately +5vdc) on the pressure switch input indicates a good oil condition. When a good oil condition is detected the LED is illuminated as GREEN. The microprocessor increments a counter one time for each bad oil condition. This same count is decreased by one half whenever a good oil condition is detected. This time is the accumulated bad oil time. If the bad oil time reaches a count of 13200 (110 seconds multiplied by 60 Hz multiplied by 2 counts each cycle), the control circuit sets the relay which de-energizes the M contact and energizes the A contact. If a jumper is installed between terminals M and 2 the module will be powered off when the relay is set. The relay is a magnetically latching relay and will remain in the set condition until the reset button is pressed on the cover, to be described below. If the accumulated bad oil time has not reached a count of 13200, the micro re-enters the power saving mode until the next line frequency interrupt occurs.

The control circuit module enters a power saving mode whenever an idle time occurs (no line frequency interrupts or setting of the relay). This allows the module to survive momentary power interruptions without the loss of the accumulated bad oil time. The module will maintain the accumulated bad oil time for at least 60 seconds during a power loss. Timing will not occur during a power loss (since it is based on the line frequency interrupt) and the LED will not be illuminated. The LED and oil pressure sensor are powered from a separate +5vdc power supply from the microcontroller and thus will not affect the microcontroller during power loss.

Figure 5:
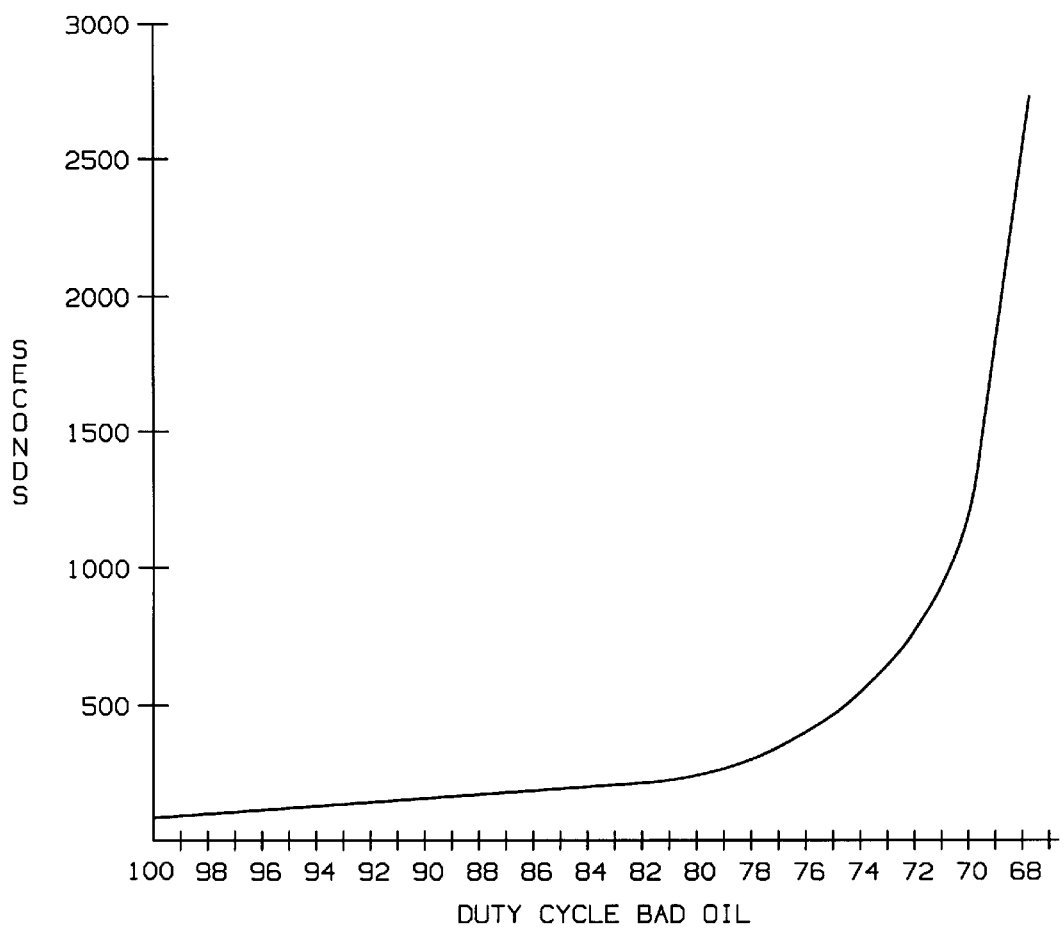
FIG. 5 is a graph showing time vs. duty cycle of bad oil pressure.

As indicated above in describing the timing operation, the bad oil count must reach 13200 before the relay is set. As noted, the good oil condition decreases this count by one while a bad oil condition increases this count by two. Therefore, if the good oil condition occurs ⅔ of the time (bad oil takes the remaining ⅓) the module will never time out (based on a 1 second time base). The graph shown in FIG. 5 indicates the time that elapses before the relay is set for varying duty cycles of bad oil (⅔ being 66.66%).

The control circuit employs a magnetically latching relay. Once this relay is set, it will remain in a set condition until the reset button is pressed. A permanent magnet is contained in the reset button of the module cover. When the button is depressed the magnet is brought near the relay. If the relay is set, the magnetic attraction of the magnet in the reset button will cause the relay to reset (i.e., the A contact is opened and the M contact is closed). This allows the control circuit to be reset when no power is present to the module.

If the control circuit powers up and detects a good oil condition, the compressor is allowed to run for 4 seconds and the relay is set which shuts down the compressor. It should be noted that a compressor never starts with a good oil condition. Thus, if a short has occurred in the cable to the oil pressure sensor or if the module has been tampered with, compressor shut down will occur. Thus a service technician may short the sensor leads together to jog the compressor for a short period of time and check the operation of the latching relay. Compressors are quite often shipped pre-charged with refrigerant and oil. The service technician must operate the compressor (once properly installed) to jog the excess refrigerant from the compressor. The control circuit made in accordance with the invention simplifies this operation with this feature.

The control circuit may be powered continuously by attaching AC line power to 2 and 120 (or 240). When attached in this manner, the LED will remain illuminated as RED after the relay is set. This allows a continuous indication of a trip condition (the microprocessor will continue to detect bad oil and time but no action can be taken since the relay is already latched in the set condition). If this type of connection is desired, power must be removed from control circuit whenever the main control system is not operating the compressor.

Figure 6A:
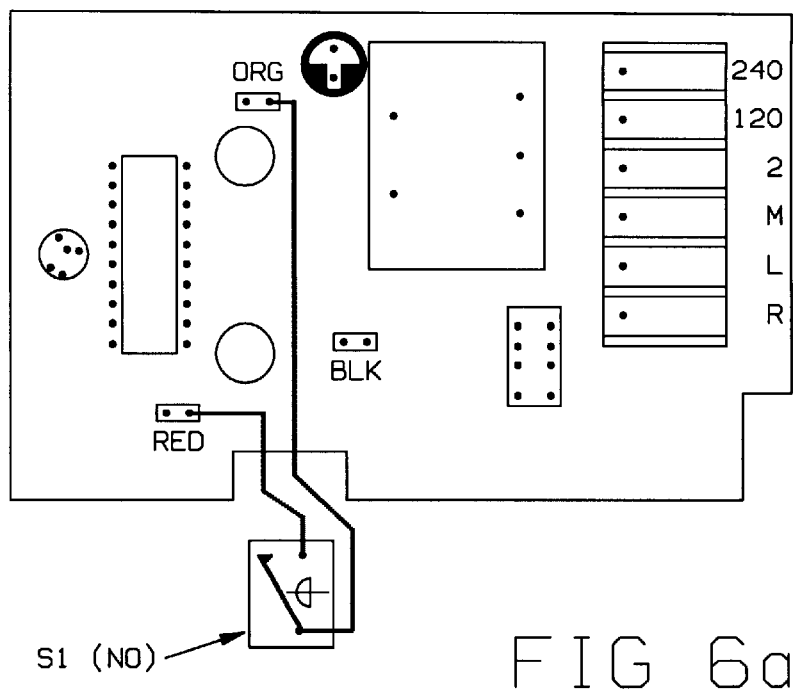
FIGS. 6a, 6b are respective schematic diagrams showing a normally open sensor S1 and normally closed sensor S2 connected to the control circuit module of the invention.
Figure 6B:
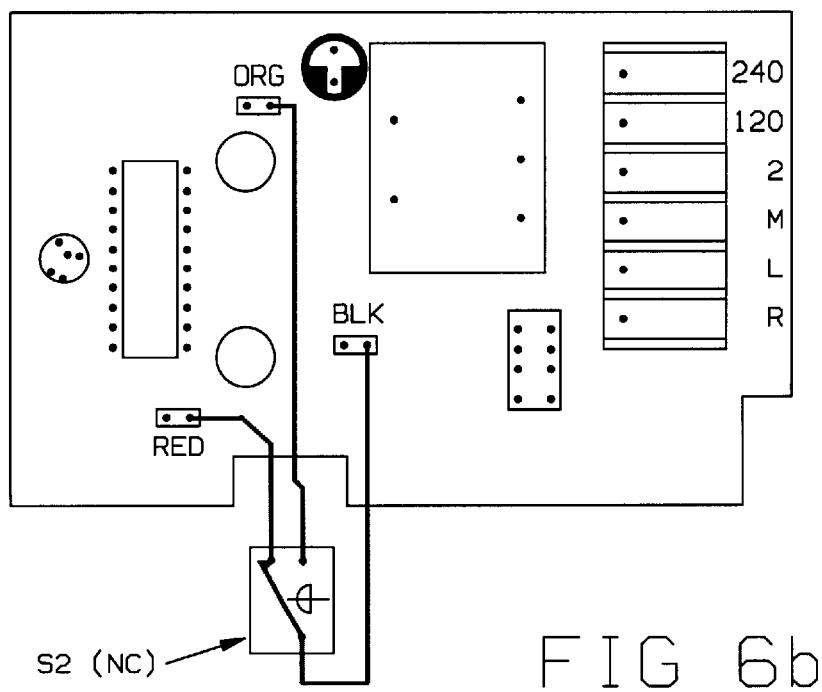

The control circuit is designed to be used with both the normally open sensor S1 and the normally closed sensor S2 connected as shown in FIGS. 6a, 6b, respectively. The control circuit module described above employs a tricolor LED display to indicate the various modes of operation. The following table indicates the meaning of the different colors.

If the pressure switch was open in step 34, then the jog mode is disabled at step 50 and the counter is checked at test block 52 to see if it has reached the maximum count, e.g. 13200 and if so the relay is latched at step 54. If the maximum count has not been reached then the counter is incremented at step 56 and the red LED is energized at step 58. Following steps 54 and 58, the program cycles back to decision block 30.

The following components were used in a module made in accordance with the invention:

| HI EFF RADIAL LED RED/GREEN | (LED1) | RES, 100K, 1/8 W, 5% | (R4, 5, 6) |
|---|---|---|---|
| RES, .51K, 1/8 W, 5% | (R12) | RES, 360K, 1/8 W, 5% | (R2) |
| 1DE3-1 PC BOARD | | RES, 5.1K, 1/8 W, 5% | (R7) |
| TERMINAL (1/4" QC) | (QC1, 2) | CAP, CER, Z5U .01 UF, 50 V | (C4) |
| 120 V–220 V:18 V TRANS | (T1) | CAP, CER, Z5U 0.1 UF, 50 V | (C2) |
| PROGRAMMED MICRO 1DE3-1A | (U1) | RES, 1.5K, 2 W, 5% | (R1, 13) |
| LATCHING RELAY | (K1) | 10 UF, 16 V ELECT RAD CAPS | (C5) |
| MPSA05, MPSA06 TRANS. | (Q1) | .47 UF, 50 V ELECT RAD CAPS | (C8) |
| JUMPER, AUTO INSERT | (W1, 2, 4) | 47 UF, 50 V ELECT RAD CAPS | (C6) |
| DIODE, GEN. PURP. REFR | (CR2-7) | 220 UF, ELECT RAD CAPS | (C1) |
| DIODE, ZENER, 5% .5 W | (CR1, 8) | .1 UF, 100 V FILM CAPS 20% | (C3, 7, C9, 10) |
| RES, 1K, 1/8 W, 5% | (R15, 16) | TERMINAL BLOCK ASSEMBLY | (P1) |
| RES, 10K, 1/8 W, 5% | (R14) | | |

TABLE 1

| LED Color | Indication |
|---|---|
| Orange | Self Test Mode |
| Green | Good Oil/Module OK |
| Red | Bad Oil |
| Red/Green Flashing | Intermittent Bad Oil |
| Orange/Green Flashing | Jog Mode/Bad Sensor Connection |

Figure 7A:
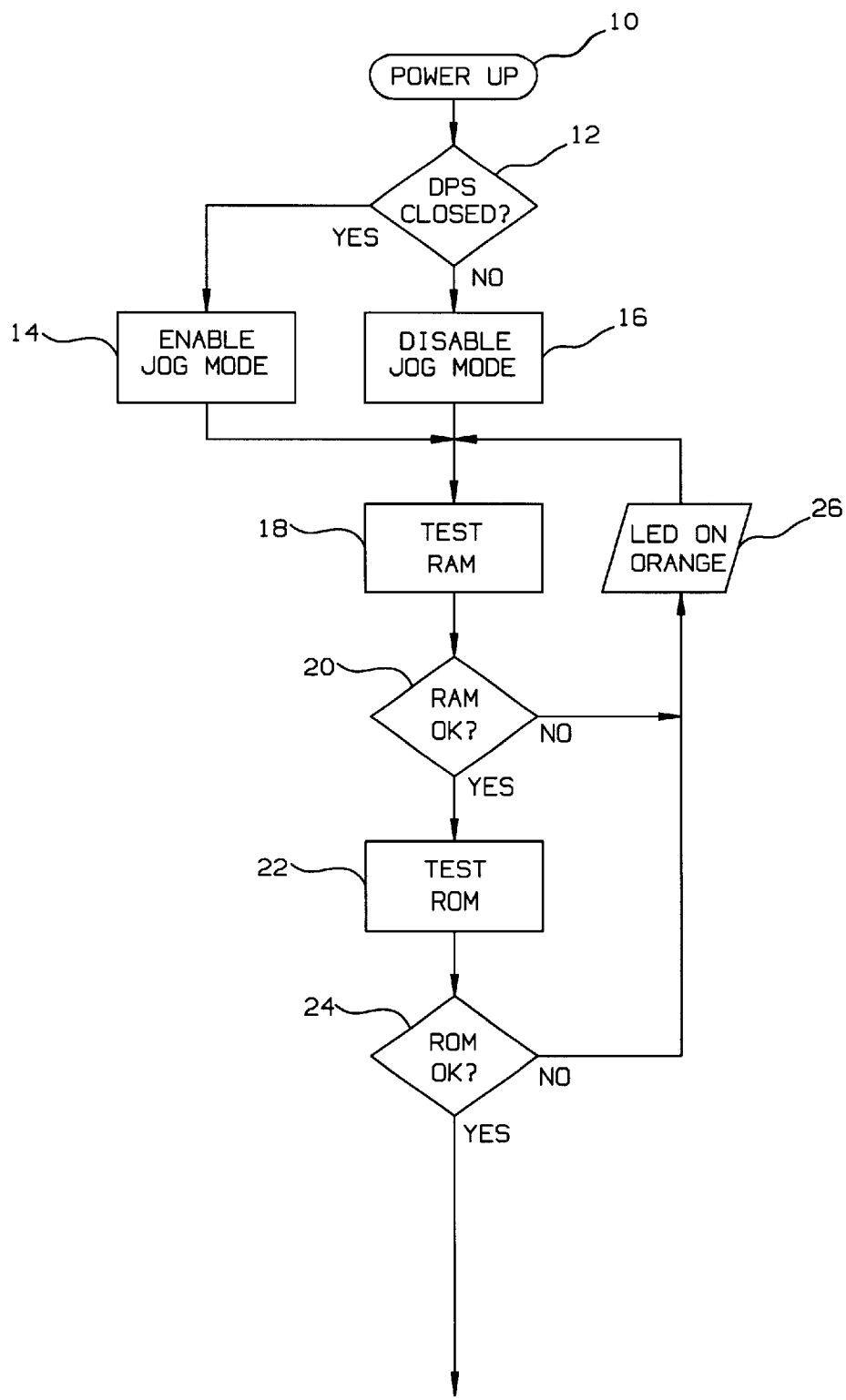
FIGS. 7a and 7b are flow chart depicting the control sequence.
Figure 7B:
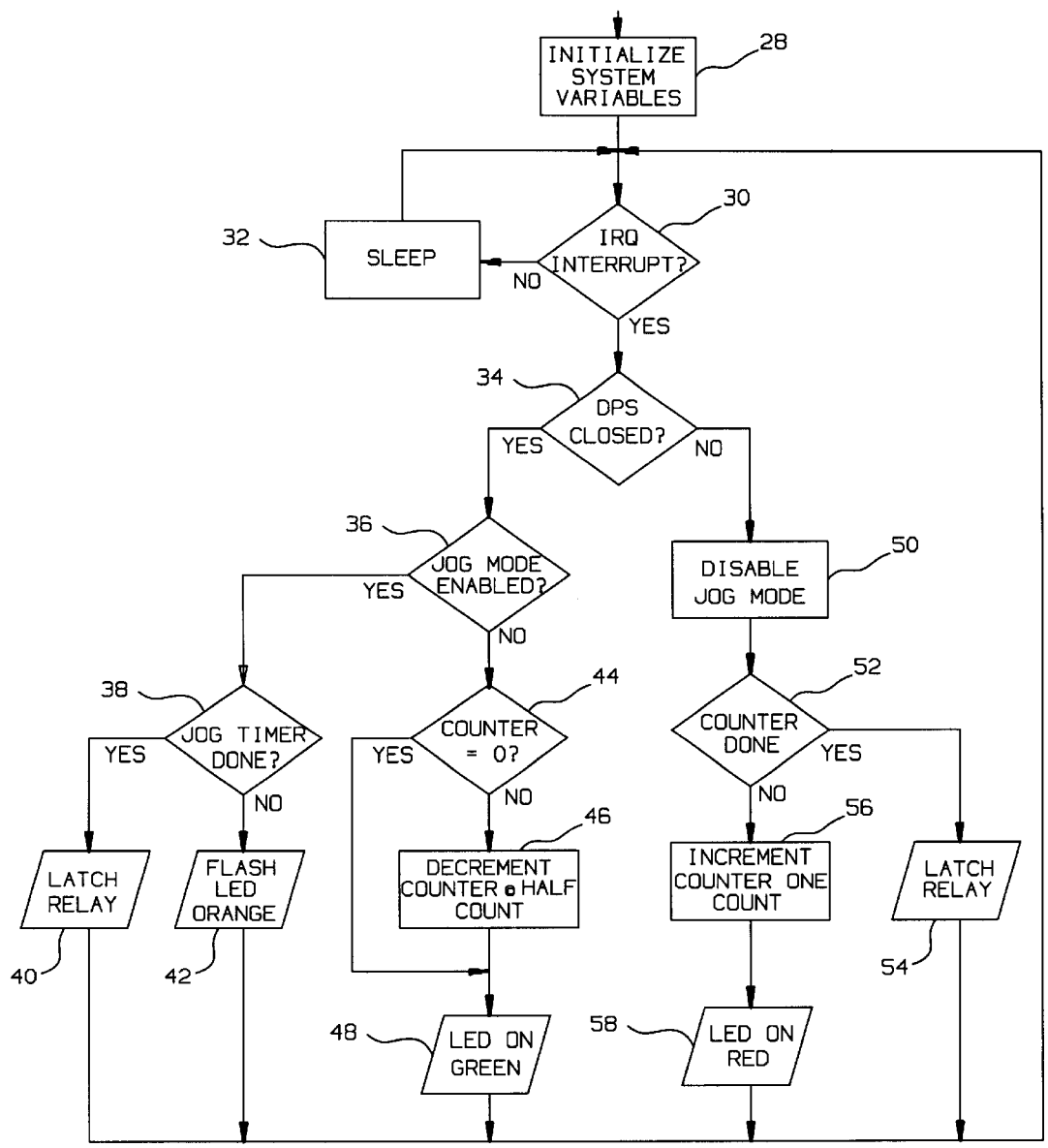

The flow chart of FIG. 7 shows the control sequence which upon power up at block 10 goes on to decision block 12 to determine if the normally open switch S1 is closed reflecting the presence of oil pressure. If so, the jog mode is enabled at step 14 and if not the jog mode is disabled at step 16. It should be noted that if a normally closed switch is employed the logic of decision block 12 is reversed. Following either of steps 14, 16, the RAM and ROM are tested at steps 18–24 with both LED's energized if there is a problem with either the RAM or ROM to produce an orange display. Once the testing has been completed the system is initialized at step 28 followed by test block 30 looking for an IRQ interrupt signal based on the 60 Hz supply. The control goes into the sleep mode at step 32. Once an interrupt occurs, the pressure switch energization is again checked and if closed the program mores to test block 36 to see if the jog mode is enabled. If the jog mode is enabled then test block 38 looks to see if the jog timer has timed out, e.g., a selected time between 1–5 seconds. If the result is positive then the relay is latched at step 40. If the jog timer is still active then the LED's are energized providing an orange display at step 42. In either case the program cycles back to decision step 30.

If the jog mode is not enabled at decision block 36 then the counter is tested at test block 44 to see if it equals zero. If not, the counter is decremented at block 46 a half count and the green LED is energized at step 48 indicating a good oil condition. If the counter registered zero at test 44 then the decrement step is skipped. Again, the program cycles back to decision block 30.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed:

1. Oil condition detection apparatus for use in compressor systems comprising:

a microcontroller having input ports and output ports, an AC voltage power source, a full wave rectifier coupled to the AC voltage rectifier, the rectifier having an output providing a signal RLAY_PWR, a first current limiting resistor serially connected to the rectifier output to provide a signal VDD_SENSOR to power a pressure sensor, an isolation diode having an anode and a cathode, the anode connected to the rectifier output, the cathode connected to a second current limiting resistor which in turn is connected to the cathode of a 5 volt zener diode, the anode of the 5 volt zener diode is connected to ground with the 5 volt zener diode providing a regulated DC voltage signal VDD connected to an input port of the microcontroller, a storage capacitor coupled between the cathode of the isolation diode and ground to provide power to the microcontroller for a preselected time upon power interruption, a pressure sensor having electrical contacts movable into and out of electrical engagement in dependence upon the oil pressure level in a compressor to indicate either a good oil condition upon sufficient pressure or a bad oil condition upon insufficient pressure, the VDD_SENSOR signal coupled to a pressure sensor electrical contact, another pressure sensor contact coupled to an input of the microcontroller to accumulate good and bad oil condition times, the microcontroller having an interrupt input port coupled to AC voltage, the microcontroller normally being in a sleep mode and being awakened on each cycle of the AC voltage source wave to detect selected functions including the oil condition, and then reverting back to the sleep mode, the microcontroller having an output port connected to a device for shutting down the compressor system whenever selected oil condition times occur.

2. Oil condition detection apparatus according to claim 1 further comprising an LED indicator coupled to signal VDD_SENSOR and an output port of the microcontroller for providing a visual indication of the status of the control.

3. Oil condition detection apparatus according to claim 2 in which the LED indicator comprises a red LED and a green LED having anodes and cathodes, the cathodes being connected to ground and the anodes being connected to a respective output port, the signal VDD_SENSOR being connected to each anode through a resistor, the green LED being energized when a good oil condition is detected, the red LED being energized when a bad oil condition is detected and an orange color being provided when both the red and the green LED's are energized upon initial power of the microcontroller.

4. Oil condition detection apparatus according to claim 1 in which the pressure sensor has normally closed contacts which open when the pressure is at or above a selected level.

5. Oil condition detection apparatus according to claim 1 in which the pressure sensor has normally open contacts which close when the pressure is at or above a selected level.

6. Oil condition detection apparatus according to claim 1 further comprising a relay having a coil connected to the signal RLAY_PWR and the device for shutting down the compressor system includes a transistor connected between the coil and ground and the base of the transistor being connected through a resistor to an output port.

7. Oil condition detection apparatus according to claim 6 in which the microcontroller increments a counter two times for each bad oil condition and decrements the counter one time for each good oil condition, and upon reaching a selected counter count the microcontroller will send a signal to the base of the transistor to cause current to flow through the transistor and energize the relay.

8. Oil condition detection apparatus according to claim 1 in which the microcontroller will shut down the compressor system whenever there is an indication of good oil condition upon start-up of the compressor system only after a selected time delay.

9. Oil condition detection apparatus according to claim 8 in which the selected time delay is approximately four seconds.

10. A method for controlling the energization of a compressor system comprising the steps of using an oil pressure switch controlling the electrical energization of a line in response to whether or not there is sufficient oil pressure and detecting whether the oil pressure in the compressor system is good (sufficient pressure) or bad (insufficient pressure) intermittently on an ongoing basis, if the oil pressure is good upon power up, allowing the compressor system to run a short period of time and then de-energizing the compressor system.

11. A method according to claim 10 in which the short period of time is approximately four seconds.

* * * * *